July 21, 1970 B. ALAIMO 3,521,260

DIGITAL DATA TRANSFER SYSTEM

Filed Aug. 22, 1966

INVENTOR

Benjamin Alaimo

By Smyth, Roston & Pavitt

ATTORNEYS

United States Patent Office 3,521,260

Patented July 21, 1970

3,521,260

DIGITAL DATA TRANSFER SYSTEM

Benjamin Alaimo, Camarillo, Calif., assignor to Minnesota Mining and Manufacturing Company, St. Paul, Minn., a corporation of Delaware Filed Aug. 22, 1966, Ser. No. 574,089
Int. Cl. G11b 15/04
U.S. Cl. 340—174.1 9 Claims

ABSTRACT OF THE DISCLOSURE

A digital data storage tape has clock track from which are derived two trains of interspaced clock pulses which must come in particular sequence to serve as data clocking pulses. In case of oscillatory tape reversal the pulse sequence reverses, which, in turn, is used to prevent data clocking.

Figures 1, 2, 3:
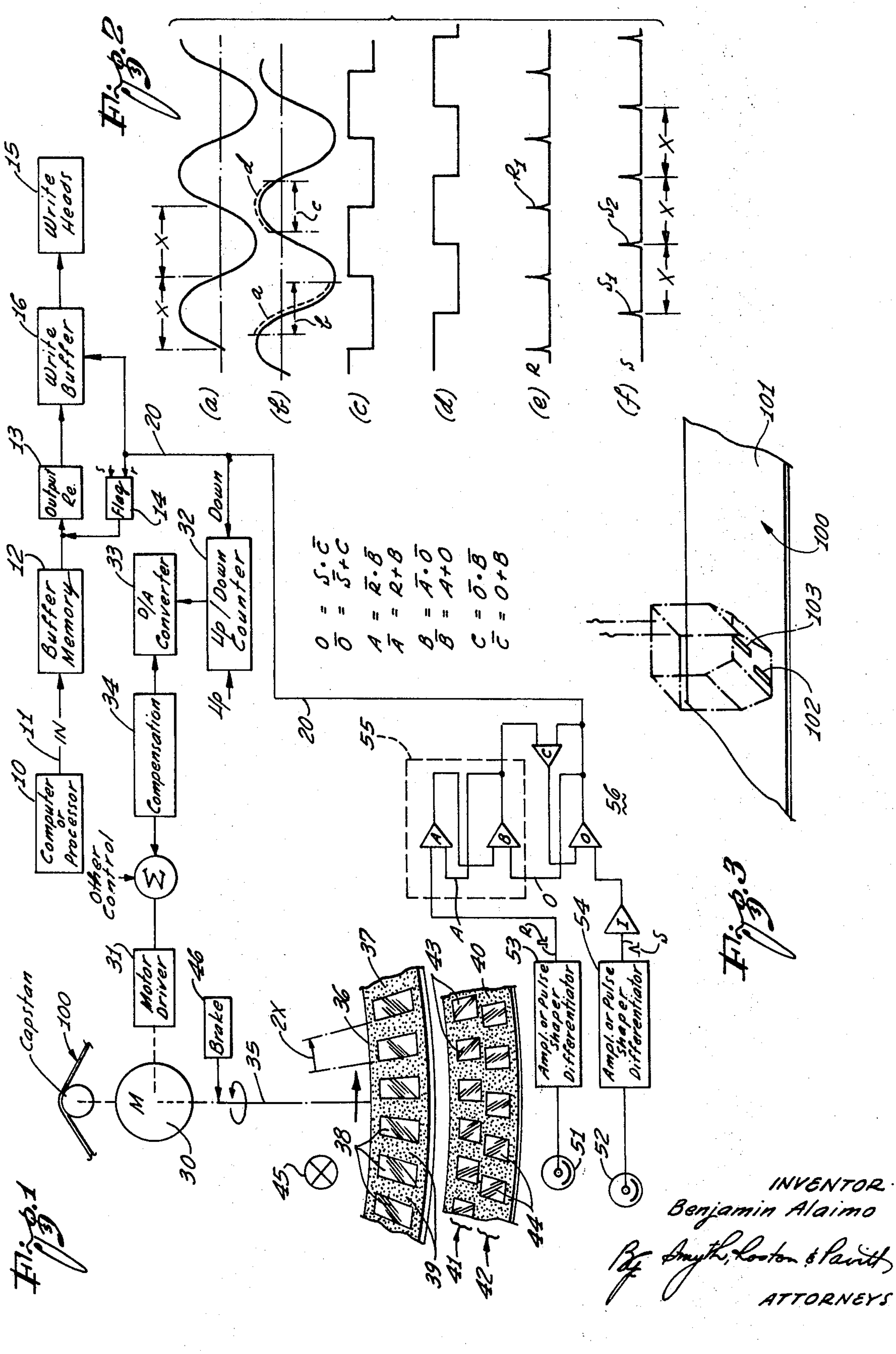

The present invention relates to the control of the transfer of digital data in relation to a movable storage medium. For such a transfer of digital data a transducer is coupled to the surface of the storage medium for the transfer of signal manifestations between the transducer and the storage medium by electromagnetic interaction. A storage register cooperates with the transducer for the transfer of digital data between the register and the transducer. This latter transfer involves electrical signals as manifestations of the digital data.

For example, in the case of recording on a magnetic tape to be used as the storage medium, the register applies electrical signals representing digital quantities to an input amplifier stage of the transducer, and the transducer converts the electrical signals into a magnetic field of particular direction to permanently magnetize the tape as it progresses past the transducer to thereby establish a record of the digital signals. For magnetic tape readout, the signal transfer and the flow of signals is in the reverse direction, i.e., from tape to transducer to register.

For a variety of reasons, it is essential that the digital data be recorded on such a storage carrier, for example, a tape, at a constant bit density along the track inscribed by the transducer on the tape; the digital data may be presumed to be represented as bivalued bits. The data may, for example, comprise a plurality of characters sequentially fed to a multistage register for subsequent recording and each character particularly comprises the same number of bits. Thus, there is a plurality of transducers, one per bit for a character, and each transducer is controlled by and from a particular register stage. The bits of a character are provided to and recorded on (or read from) concurrently across the tape. The bits of sequentially provided characters are arranged along parallel tracks on the tape, and it is the bit density on each track which should be constant.

For constant bit density per track and concurrent recording of the bits of a character, the recording of the several characters should be controlled in that the bits of a new character are to be provided to the tape by the transducers after a predetermined increment of tape has progressed past the transducers since the previous character was recorded. Also the bits of the character during readout should be assembled in accordance with a similar rule. Because of skew, the bits of a character to be transferred from the tape to respective read transducers occur somewhat consecutively rather than concurrently in the strictest sense. For proper assembly of the bits pertaining to a character, the passage of tape increments is likewise to be metered in order to correlate the assembly time to the speed of the tape.

It follows that for proper coupling of the transducers to the tape, progression of the tape must be accurately determined to provide for proper timing of the data transfer as between tape, register and transducers. If the tape is controlled for constant speed, and if the characters are available for recording at a constant rate, then the characters will in fact be recorded automatically at a constant bit density per track without requiring the metering of the passage of constant tape increments. However, when one or both of these two conditions are not fulfilled, such metering becomes essential in order to provide constant bit and character densities on the tape.

For tape read out or reproduction the situation is similar in that no such metering is necessary where the tape runs at a constant speed so that the character assembly time can be controlled in reliance on that fact, otherwise it is important and necessary that tape increments be metered to establish tape speed dependent, variable assembly times for each of the sequentially read characters.

Constant speed recording or reading of tape is a rather cumbersome condition. Tape starting and stopping times, for example, are thereby excluded from being useful for the recording and reading operations which in turn establishes delays and waiting periods. A constant rate data supply may be counted on if the data to be recorded are derived for example from a computer tending to dump a portion of its core memory content into a memory extension device such as a magnetic tape or disk. However, in the field of data acquisition, data to be recorded may appear sporadically, even very infrequently or in bursts. Thus the tape recording, particularly, should be conducted without having to rely on a constant data supply rate and without requiring constant tape speed, so that recording at a constant bit density and a speed independent, skew compensating character assembly time at readout requires the metering of the passage of tape increments of predetermined and fixed length. Details of variable speed recording and reproducing are expounded more fully in copending application Ser. No. 471,959 filed July 4, 1965 of common assignee.

The tape may be provided with reference markers identifying such increments; for example, the tape may have a prerecorded clock track. For such a tape the metering process involves the detection of the passage of these markers as the tape or any other storage device, for example a disk, moves. If there are no such markers on the recording medium, then the clock signals may be derived from the transport mechanism itself, for example, a tachometer type device having manifestations representing the passage of fixed tape increments. For example, markers on a tachometer disk are monitored by a stationary scanning device while the tachometer disk rotates in strict phase and frequency synchronism with the tape or whatever type of recording carrier one has chosen.

Here one has to look at the tape-increment metering device in some detail. Whether tach disk or tape clock, in either case the movable component has certain physical characteristics forming a periodically variable pattern in that this characteristic varies for example between two values. For example, this clock or marker track may be comprised of magnetizations of alternating directions, equivalent to an NRZI recording format of bits having the value 1. Or the track may comprise alternatively spaced translucent and opaque or reflecting markers.

In either case, the passage of increments of similar length is metered only from marker to marker with a periodic repetition of the detection of two different characteristics (magnetic field directions, opaqueness and translucency, etc.). The metering process in particular is carried out by a stationary scanner or detector responding to variations in the characteristics defining the marker or clock track as it passes the scanner. This response is not directionally sensitive, which leads to the following problem.

When the drive mechanism and the tape are about to stop, backlash and oscillatory movements delay the period between the time the tape and its driver has for an instant the ultimate stop position for the first time, and the actual cessation of movement. During that period, a rapid sequence of clock signals may be produced simulating the passage of metered tape increments. The clock pulses result normally from the sequential passage of different markers on the tape or tachometer disk through the marker detection zone, but the backlash may cause the same marker, i.e., two extreme values of the characteristics defining a marker-no marker transition on the marker or clock track, to oscillatorily pass through the detector several times, and this produces the erroneous clock pulses tending to control data transfer steps in between transducer and register though such transfer is not desired as the tape is about to stop.

Here it is of particular importance to note what the particular operations are which are controlled by the marker and clock pulses. For recording, they couple the register to the input stages of the transducers and the input stages determine the particular current flow to energize the transducers in accordance with the digital content of the transducer input stages. Another clock pulse will cause the transfer of another set of bits from the register to the transducer input stages to control the current in the transducer in accordance with the new digital content thus transferred. Each such clock pulse will provide another transfer of bits to control the current in the transducers in accordance with each sequentially provided set of bits. It is this control which provides a bit transfer from register to transducer for recording in sequential steps and in synchronism with the production of the clock pulses.

If clock pulses are produced now while the tape oscillates, characters are sequentially fed from the register to the transducer for control of the trnasducer current, but since the tape oscillates and does not progress unidirectionally, no meaningful recording is produced, and the characters thus transferred are in fact lost.

The clock pulses provide for additional control operations which compounds the difficulties of the "backlash" situation. In the copending application of common assignee, Ser. No. 471,959, filed July 4, 1965, there is disclosed a device with the aid of which one can render the tape recording process independent from the rate (below a predetermined maximum) of data supply, and the system disclosed therein prevents the tape drive characteristics from forcing a particularly variable data supply rate on the data source for non-constant tape speed recordings. A salient feature of the device disclosed in that application is a buffer through which the data must flow as between source and storage; they are supplied from the source to the buffer, and they are withdrawn from the buffer for final storage and recording.

The basic function of the buffer is to accommodate asynchronous relations as between the data supply and the data withdrawal. The tape drive is controlled by the state of filling of the buffer. The number representing the filling state is incremented each time a character is fed into the buffer, and this number is decremented each time a character is withdrawn from the buffer. That withdrawal is, as has been stated above, controlled by the clock pulses produced at the rate of tape progression. Therefore, the decrementing of the number representing the filling state of the buffer is also controlled to that extent by the clock pulses. For purposes of this control the clock pulses as produced are a representation of the tape speed. Thus, a rapid production of such clock pulses pursuant to an oscillatory motion of the tape about its final stop position grossly falsifies this tape-speed dependent input signal of the tape motor control servo loop as established in this manner.

The problems resulting from a clock pulse simulation for reasons as aforedescribed, are now dealt with in the following manner. First the tape transport is continuously subjected to a braking force to ensure that the oscillations and backlash of the moving parts when about to stop are reduced below a particular limit, particularly below one-half the distance value of the increment length to be metered. That value is not critical but gives optimum performance.

Next, the passage of tape increments is metered in that two out-of-phase pulse trains are produced the rates of which are similar and correspond to the passage rate of the tape increments. For the clock pulses to be produced the pulses of the two trains must occur in an alternating relationship, if not, the clock pulses are not produced. Specifically the pulses of one pulse train serve directly as clock pulses as long as each such pulse is preceded by a pulse from the second train which in turn is preceded by the respective last first train pulse that served as clock pulse. This way operative clock pulses can be produced only if the tape progresses in the right direction and for the proper distances defining the increments to be metered.

While the specification concludes with claims particularly pointing out and distinctly claiming the subject matter which is regarded as the invention, it is believed that the invention, the objects and features of the invention and further objects, features and advantages thereof will be better understood from the following description taken in conjunction with the accompanying drawings in which:

FIG. 1 illustrates somewhat schematically a block diagram of the principal aspects of the present invention;

FIGS. 2*a* through 2*f* illustrate waveforms of signals and signal characteristics pertinent in the operation of the circuit shown in FIG. 1; and FIG. 3 illustrates somewhat schematically a perspective view of an alternative mode of producing the clock pulses.

Proceeding now to the detailed description of the drawings, in FIG. 1 thereof there is shown a block diagram of the preferred embodiment for practicing the invention. It is one of the aspects of the present invention to provide for an improvement in the digital data transfer system as disclosed in the above mentioned copending application Ser. No. 471,959. Thus some of the elements disclosed in this copending application are also shown in this specification, but their function and structure are summarized and generalized to a substantial degree.

It may be assumed that, for example, there is a unit 10 which provides the data to be recorded. The unit 10 may be a computer and the tape unit to be described serves as a computer memory extension. The unit 10 may be a data acquisition device incorporating measuring instruments the output signals of which are to be recorded. The unit 10 has output channels 11 which furnish at times data in a particular format and at a rate which may vary within wide ranges. The unit 10 will, preferably, provide such data in form of a sequence of characters with each character having a plurality of concurrently provided bivalued bits. This format is often described as serial-by-character-parallel-by-bit. Indicidual characters as defined by these bits may be presented at a constant rate, but alternatively the processing device or unit 10 may provide such data rather sporadically and irregularly and at a totally unknown rate and frequency except that a maximum rate must be specified above which the data should not be supplied.

In order to render the recording device, in the present case a magnetic tape recorder, independent from the rate and the degree of regularity with which the data source 10 furnishes these characters, there is provided a temporary buffer memory 12 having a capacity selected to accommodate the most extreme cases of computer or processer data issue rates. As outlined in greater detail in the copending application, the principal function of this buffer memory is to render the output operations of unit 10 substantially independent from the characteristics according to which the recording unit can accept data for storage at a constant bit and character density within the meaning as defined above.

The buffer memory 12 as shown in FIG. 1 receives the data at a rate determined by the processor 10. The buffer memory 12 provides the data for recording on a tape 100 at a rate determined by the progression of tape 100 whereby the degree of filling of the buffer, in turn, controls the rate of progression of the tape. This is outlined also in greater detail in the above mentioned copending application, and important features are repeated here only to the extent necessary to understand the present invention.

The buffer memory 12 will at times provide data to an output register 13. The transfer of data from the buffer memory 12 to the output register 13 is basically dependent on two conditions. One condition is the availability of the register 13 for receiving new data, and the other condition is the availability of data from the buffer memory 12. These aspects are also described in greater detail in the copending application, particularly in view of the fact that the data should be set into the output register 13 in the same sequence with which the characters were provided by the processor or unit 10 at its output channel 11.

Data held in register 13 are copied into a write buffer register 16, in that the input sides of the several stages of buffer register 16 are coupled to the output sides of respectively corresponding stages of memory output register 13. That connection may be a permanent one, but for a transfer of bits from register 13 to register 16 reception of a clocking signal by register 16 is required. The states of the stages of register 16 determine at a suitable power level magnitude and direction of energizing currents in write or record transducer heads 15, for magnetizing the magnetic tape 100 as it progresses past the transducers.

It may be assumed, for example, that the characters as provided and to be recorded each comprise seven bits, and these bits are to be recorded on tape 100 in seven parallel tracks running in the direction of the tape movement. The bits of one character are to appear across the tape in a parallel-by-bit format. Bits of sequential characters having the same position within the seven bit format chosen for the characters are, therefore, located on a common track in the direction of tape extension and advance. A predetermined constant character density on the tape is therefore more precisely defined by a constant bit density in each of the tracks.

The electric current in the write heads 15 is controlled by the write buffer amplifier 16 as mentioned above and of course the buffer amplifier 16 has seven storage stages as has the output register 13, and there are accordingly provided seven write heads 15.

A flag flip-flop 14 represents the status of register 13 as to its capability of accepting new data. When flag 14 is set, register 13 is occupied, when flag 14 is reset register 13 can receive a new character. The flag flip-flop 14 has a set and a reset input side. The set input side of flag 14 receives a control signal whenever a character is being set into the output register 13. Thus, for flip-flop 14 to be set it must be in the reset state, as this is a condition precedent that register 13 can in fact accept a character from buffer 12. Furthermore, the flip-flop 14 will be set when such a character is in fact available for transfer to register 13. The flag flip-flop 14 will remain set until a character is copied from the output register 13 to the write buffer register 16.

The reset state of flag 14 is controlled to concur with the transfer or copying of a character into register amplifier 16. A character must occupy register 13 and flag 14 must remain in the set state until the preceding character now held in register 16 has been recorded. Therefore, sequential transfer steps between registers 13 and 16 depend on the period required for recording a character. The register 13 is in turn, available for accepting a new character immediately after a transfer of a character to register and amplifier 16, so that this transfer step controls also the resetting of flag 14. It follows from the foregoing, that the resetting of flag 14 and the copy-control or transfer process for data into the register amplifier 16 is to be controlled at the particular recording rate.

The transfer process as described is controlled by a signal in a command line 20 which, for example, furnishes clock pulses for clocking the data applied by the output side of register 13 to the input side of the buffer 16, and into the several stages of the buffer 16. As mentioned above, the same signal resets the flag 14. It should be emphasized, that the control pulses for line 20 are to be produced solely in dependency upon the availability of recording space on the tape and the desired recording format. Otherwise the system is devised that there is always a character available in register 13 for such transfer. From this point of view, one can see that the buffer 12 and register 13 could be a part of the data supply unit; if they are not, the buffer with its output register 13 adapts the data supply rate from unit 10 to the demands by the recorder as particularly evidenced by pulses in line 20.

Before describing in detail the production of the clock pulses in the line 20 it shall be mentioned further that a capstan motor 30 drives the magnetic tape 100 and is controlled by a motor driver circuit 31 receiving analog type control signals as follows. As also disclosed in the copending patent application mentioned above, there is provided a counter 32 which provides digital signals representative of the state of filling of the buffer memory 12. This counter 32 is a bidirectional one and can thus be described as an up and down counter.

The number held at any time in counter 32 represents the state of filling of buffer memory 12. This number is therefore, always incremented by one digit unit of counter response whenever a character passes from the unit 10 into the buffer memory 12. This is symbolically denoted with the "up" input for the up and down counter 32. The count number held in the counter 32 is decremented by one digit unit for each character transferred or copied from the output register 13 to the write buffer 16. As this latter transfer is controlled by a signal in the line 20, it follows that the up and down counter 32 will always be decremented by a signal in line 20 controlling the transfer of data to the write buffer 16.

The digital output of the up and down counter 32 is passed to a digital-to-analog converter 33 which provides a suitable analog signal representative of the state of filling of the buffer memory 12. The analog output signal from converter 33 is passed through a compensation network which provides the necessary frequency response correction to achieve the required bandwidth and damping in the capstan drive system. The output of the compensation network 34 is then passed through a summing network to the motor driver 31 for control thereof. The summing network has an alternative input which may override the control as provided by the output signal from the compensation network 34, if for any reason the motor 30 is not to be driven in accordance with the filling state of the buffer. There remains now two points to be discussed to complete the description of the control loop. One point is the specific characteristic of motor control in dependency upon the buffer content, the other point is the withdrawal rate of characters from the memory buffer through register 13 into write buffer 16.

Here we must again state the specific objective: the recording is to be made at constant bit density. Therefore, the control pulses in line 20 must follow at a rate proportional to the passage of similar tape increments per unit time, i.e., the rate of the control pulses in line 20 must be proportional to the speed of the tape. The pulses in line 20 are now further applied to the counter 32, causing the counting number therein to decline. From this it follows, that motor 30 must run at a constant speed when the rate of data supply to buffer 12 (counting up) equals the rate of withdrawal (counting down). Since it is postulated that a character must be available always in register 13 when recording is desired, the buffer 12 must never be completely depleted. Thus, motor 30 must stop when a minimum filling state in buffer 12 has been reached. Motor 30 should not restart unless the filling state exceeds a predetermined minimum state, which cannot be below the minimum state for stopping, but should be somewhat above for reasons of dynamic stability. If the unit 10 is, for example, a data acquisition device which provides data at a slow and possibly irregular rate, or in irregular bursts followed by pauses of uncertain duration, then it take a certain minimum of characters, i.e., a certain minimum of acquisition steps, before the motor 30 will advance at all. Characters can be recorded on tape only when the motor advances, so that it is essential that the tape moves before characters will be withdrawn from the buffer. Once the motor starts and the tape moves, recording may commence, and thus the buffer memory will then be depleted of characters. Should this occur at the time the unit 10 provides characters at a very low rate, then soon the buffer memory content will drop below minimum, and after a few characters have been wihtdrawn from the buffer, the motor 30 will come to a stop again.

If the unit 10 may provide data at a rather high and constant rate commencing to do so rather suddenly, then the motor will be accelerated due to the increasing buffer content, and until motor and tape advance at such a speed that the pulses in line 20 have the same rate as the data being supplied to the buffer. If the pulses in line 20 have that rate, there will then be equilibrium between the rate of supply and rate of withdrawal.

In the preceding paragraphs conditions have been outlined, for the pulses in line 20 controlling the data withdrawal from the buffer in order to correlate data withdrawal from buffer and motor control in general. Now we must consider that data are withdrawn from the buffer for purposes of recording, and this recording process must satisfy the condition of constant bit density per recording track. With this we proceed to the description of the production of the pulses for the line 20. The control principles expounded in the preceding paragraph are of a generic nature and are valid entirely independently from the particular mode with which the pulses in line 20 are being produced.

To summarize, the pulses in line 20 (a) cause withdrawal from the buffer memory 12, (b) decrement the counter 32 and (c) control the rate of recording by the write heads 15. The main purpose of this type of control is now to provide a recording at a constant character and bit density as defined. Thus, the pulses in line 20 are to be produced at a rate proportionate to the passage of similar tape increments under heads 15. The increments which are to be of equal length represent the desired bit densty for each track. Thus the rate of the pulses in line 20 must be proportionate to the tape speed.

If the capstan drives the tape in a slippage-free engagement therewith then the pulses in line 20 may have a frequency directly proportionate to the motor speed and can be derived from the motor rather than from the tape itself. Thus one can use the tape or any element driven by motor 30 as a source for the production of pulses in line 20. For example, the drive shaft 35 of motor illustrated only symbolically, may carry a disk 36 having a circumferentially disposed track 37 which is comprised of, for example, translucent markers 38 on an opaque or reflecting background 39. These markers 38 are spaced along the track 37 at a distance determined as follows:

When the motor 30 has rotated the disk 36 for an angle corresponding to the distance of one marker spacing, then the capstan coupled to the motor 30 has advanced the tape 100 by two bit spacings along a single tape track. In the following description, particularly when we refer to FIG. 2, we presume that the tape increment to be metered corresponds to a rotational angle of disk 36 or shaft 35 denoted with reference character X. Thus the marker modulation of track 37 has a repetition rate of 2X. This latter relationship is not critical but convenient as will be expounded more fully below.

A stationary grid plate 40 is provided in registering alignment with a portion of disk 36. The grid plate or mask plate 40 has two short marker tracks 41 and 42 which are arcuate to follow the curvature of the disk 36. There are transparent markers 43 pertaining to track 41 and they are phase shifted by, for example, 90° with reference to transparent markers 44 pertaining to track 42.

Underneath track 41 there is provided a photoelectric sensor or detector 51 sensing the entire illumination that is permitted to pass through the transparent markers 43 of track 41. The detector 51 must be shielded against any light that may pass through markers 44 of track 42. Conversely, underneath the track 42 there is provided a photoelectric detector 52 sensing the illumination permitted to pass through markers 44, but detector 52 is shielded from markers 43.

Finally there is provided a light source 45 to provide the above mentioned illumination and being located, for example, above the disk 36. Optical alignment is now established in the following manner: Light from the lamp 45 falls onto a portion of disk 36 whereby the illumination field has approximately the same dimensions as the marker plate 40 underneath. The several translucent markers 38 of disk 36 pass through the light path from lamp 45 as disk 36 rotates. Whenever the markers 43 register with markers 38, strictly speaking with half the width radially of the several illuminated markers 38, then light will fall onto the photocell 51. After an advance of the disk 36 by an angle (X) which is half of the angle corresponding to the marker spacing of markers 38 (angle 2X), the opaque portions 39 will block the light path from the source 45 to the translucent stationary markers 43, and no light will fall onto the photocell 51. The same holds true in principle with regard to the relation between the light source 45, the respective other half of the markers 38 as illuminated, and the translucent markers 42 of mask of grid plate 40, but the phase is different. Whenever markers 42 register with markers 38, the photodetector 52 will receive light, after a rotation by angle X the detector 52 will remain dark. In either case detector 51 receives half of the maximum light intensity.

It follows, therefore, that the electrical signals as produced by the photodetectors 51 and 52 are sinusoidal waves, but the two wave trains have a phase shift of 90° in between. Leading or lagging of the two wave trains relative to each other will depend on the direction or rotation of disk 36. This direction is now chosen that the wave train from cell 52 is the leading one, as is illustrated in FIG. 2*b*. Thus the train from cell 51 lags as shown in FIG. 2*a*.

The curves in FIG. 2*a* and FIG. 2*b* can be construed in two different ways. First, the abscissa can be regarded as showing progressing phase angles from an arbitrarily selected zero position of disk 36 in relation to grid 40. For this interpretation the curves 2*a* and 2*b* represent the amount of light permitted to pass through the light modulating assembly in the respective phase angle positions of disk 36 in relation to mask 40. Alternatively, the curves as plotted will in fact be observed on an oscilloscope as signal variations in real time if the motor 30 drives the disk 36 at a constant speed.

The signals as provided by the photodetectors 51 and 52 are respectively processed in stages 53 and 54. It suffices to describe these stages rather summarily. They include each, first, an amplifier in order to furnish output signals at a more suitable power and impedance level. The amplified sinusoidal signal is converted into a train of rectangular shaped pulses by operation of, for example, a trigger state of the Schmitt trigger type and being adjusted to respond, for example, to the crossings of the sinusoidal signals as produced through the level L as indicated in FIGS. 2*a* and 2*b*. Interpreting these two curves 2*a* and 2*b* as A.C. type waves, even though they are pulsating D.C., it can be seen that this level L is indicative of the so-called zero crossings of the corresponding A.C. waves. It can be seen that block shaped pulses as respectively shown in FIGS. 2*c* and 2*d* are being produced, having similar length and similar length pauses in between sequentially provided pulse blocks.

Finally each stage 53 and 54 includes a differentiator with a rectifying output in order to produce unidirectional, spike shaped pulses for the leading and for the respectively succeeding, trailing edge of each of the block shaped pulses as produced. FIGS. 2*e* and 2*f* illustrate schematically the resulting pulse trains. This is only a symbolical representation if the abscissas are construed as angles. The production of these differentiated pulses requires the time element, i.e., actual rotation.

The pulses plotted in FIG. 2*d* are denoted R pulses and are derived ultimately from the detector 51, whenever the illumination produces a crossing of the signal level through level L in the up or down direction. The pulses plotted in FIG. 2*f* are denoted S pulses, and are derived from detector 52 in an analogous manner. One can see that the pulses R and S are in phase opposition. Each pulse S and each pulse R, taking the two pulse trains individually, occurs after the rotation of disk 36 by an angle X which corresponds to the tape increment to be metered. A pulse S follows a pulse R and vice versa, respectively, after rotation by the angle $X/2$.

The pulses S and R are now used to control the providing of trigger signals for the line 20 mentioned above. In particular the pulses S may serve as trigger pulses proper in line 20, and pulses R control whether or not a pulse S is permitted to enter line 20. A tripper signal S should be provided only as long as the disk 30 rotates in one particular direction; no trigger signals will be produced for the line 20 if the disk rotates in the opposite direction. This aspect is of particular importance for the period of time when the motor 30 has slowed down to stop but has not yet come to a complete stop. Backlash and other mechanical operations mentioned above may cause the motor shaft 35, tape and disk 36 to oscillate temporarily for short distances. These oscillations may occur at particular positions of disk 36 in relation to mask 40, so that the corresponding electrical signals as produced in detector 52 are close to the trigger level L for the block pulse generation in stage 54. This in turn may result in the production of a group of pulses S following each other at a rapid rate, and if such pulses were permitted to pass to the line 20, they would cause a rapid transfer of data from the register 13 to the buffer register 16 and from there to the write heads 15, even though such transfer is undesired at that point, because the tape has not advanced for the desired increments in between each such parasitic pulses S.

In order to avoid oscillations by the motor and by disk 36 over a range comparable with the incremental distance of the tape determining the bit density and corresponding to an anxle X of rotation of disk 36, there is first provided a brake 46 which provides continuously a drag on the rotary output of motor 30. For proper adjustment of the driver control 31 minimum power requirements are set up which the motor 30 has to overcome in order to advance at all. On the other hand, this permanently applied brake dampens materially the oscillations of the shaft 35 below the particular deflection angle X of phase shift between the two marker tracks 41 and 42. The reason for this will now be developed more fully.

Considering FIGS. 2*a* and 2*b*, one can see that the signal level L (for convenience assumed to be similar in the two channels) determines the production of the pulses S and R in that such a pulse is always produced when the signal level in the respective photocell and after amplification traverses that level L. Assume now that by regular motion a pulse S was produced, and that the regular stop position of the rotary assembly is defined in relation to the signal levels so that another pulse S should not be produced. For example, as indicated in FIG. 2*f*, it may be pulse S1 which is the last correct S-pulse to be produced, and the stop position after production of this pulse S1 is such that in relation to the position in which pulse S1 was produced, the disk 36 should rotate for less than angle X.

For reasons expounded above, disk 36 may oscillate. Pursuant to such oscillations the signal level in cell 52 may vary for example, over the full range *a* as denoted in FIG. 2*b*, corresponding to an amplitude range of actual oscillations of the range *b*. Here then pulses S will be produced repeatedly, as often as pursuant to such oscillations the level L is being traversed. By comparing FIGS. 2*a* and 2*b* one can see that no pulses R will be produced if the oscillations remain in angle range *b*, slightly smaller than X.

More precisely, no pulse R should possibly be produced, because a pulse S may serve as a clock pulse in line 20 only if preceded by a pulse R. These parasitic pulses S as produced now should not serve as clock pulses in line 20; thus, the oscillations if producing pulses S must not produce pulses R, which in turn restricts the range of permissible oscillations to that range *b*.

Now consider another point. If the last pulse to be produced regularly was a pulse R, for example pulse R1, and if the regular stop position of the system is so that the next pulse S is not to be produced, then one can see that the oscillations should not exceed the angle range *c* as illustrated in FIG. 2*b*, so that no pulse S be produced, i.e., the signal level in cell 52 pursuant to such oscillations should stay in the range *d* and never traverse the level L. The repeated production of pulses R is to be ineffective. Angle range *c* is likewise slightly smaller than X.

By comparing these two different situations and by considering the fact that the stop position in either case is actually unknown or uncertain within the ranges *b* or *c*, it follows that the damping of the brake 46 must be such that the oscillations have an amplitude smaller than a corresponding deflection angle of disk 36 of $X/2$, provided the pulses R and S are phase shifted by 180° ($=X/2$ of disk rotation) as shown. If pulses R and S are not in direct phase opposition, then one of the two phase angles as between two succeeding pulses S and R, or R and S, is smaller than $X/2$, and in this case the oscillations must be damped by the brake to less than that smaller phase angle. Thus the device and the arrangement as shown results in minimum stringent requirements for the brake 46 for a given rotational angle value X for a particular bit spacing.

Having developed the basic conditions for the pulses S and R, we proceed to the description of the control circuit processing pulses S and R. The control circuit is comprised of what could be called a gating portion 56 and a flip-flop portion 55 interconnected as follows. The flip-flop portion 55 is, for example, established by two "NOR" gates A and B, and the gating portion 56 is comprised of an inverter I and of two "NOR" gates C and O, respectively. The input side of the inverter I receives the pulses S from the stage 54. The output side of the "NOR" gate O leads to the trigger signal line 20 as well as to the set side input of the flip-flop 55.

A trigger pulse in the line 20 will be regarded as a true signal as logic signal furnished by the output "NOR" gate O. Such a true signal can be produced only if the two inputs of "NOR" gate O are both false. A false signal is produced by the output side of the inverter I whenever there is a true signal S applied to the input side of the inverter I. Thus a trigger pulse in line 20 is a pulse S itself if it is permitted to pass through the "NOR" gate O, which is the principal component of the gate assembly 56. The output side of the "NOR" gate O leads additionally to the set side input of the flip-flop 55, which is one of the inputs of the "NOR" gate B. The reset side input of flip-flop 55 is one of the inputs of "NOR" gate A, and it is connected to receive the signals R as derived from stage 53.

For convenience of description we use identical symbols for a "NOR" gate, its output line and output signal, and it can thus be seen that the outputs of the several "NOR" gates determine the inputs of other "NOR" gates in accordance with the following relationships:

$$O=S\overline{C} \qquad \overline{O}=\overline{S}+C \qquad A=\overline{R}\,\overline{B} \qquad \overline{A}=R+B$$

$$B=\overline{A}\,\overline{O} \qquad \overline{B}=A+O \qquad C=\overline{O}\,\overline{B} \qquad \overline{C}=O+B$$

Initially and at a time when neither a pulse R nor a pulse S is true, the output of the inverter I is true so that the output of "NOR" gate O must necessarily be false, and the line 20 does not receive a trigger signal. Additionally the circuits 55, 56 establish a normal relation which can be defined as $\overline{A}\ B\ \overline{C}\ \overline{O}=1$. This is the regular waiting state for the system, and it may have been established by a pulse R before a pulse S is about to turn true.

In this normal waiting state the principal gate which is the "NOR" gate O of the gating circuit 56, is prepared or gated open. "NOR" gate C provides the particular gating input for the "NOR" gate O. This gating signal must be false in order to keep the "NOR" gate O in a gated open state, and in the waiting state C is false indeed.

When now a pulse S turns true, the output of inverter I turns false, and there is a coincidence of two false inputs for the "NOR" gate O, so that its output turns true. Therefore the pulse S is transmitted as trigger pulse into line 20. The pulse O, which is the gated-through pulse S, sets also the flip-flop 55. The output of "NOR" gate B is, therefore, locked to the false state by flip-flop action in a conventional manner.

Signal S decays after a short duration, and the output of gate O turns false again. Coincidence of false signals appear now at the input side of the "NOR" gate C, the output thereof turning true to lock the "NOR" gate O to the false state. In the following it can be seen that any true signal S resulting in a false signal at the output side of the inverter I is not transmitted through the "NOR" gate O, because its gating input side is true, to which state it is locked by the flip-flop 55, and thus the output of "NOR" gate O cannot possibly turn true.

In case the motor 30 advances properly and not oscillatorily, there soon will appear a signal R. As signal R turns true, it resets flip-flop 55 whereupon the coincidence of false signals at the input side of "NOR" gate C is destroyed, the output thereof turns false, and this false output signal of "NOR" gate C is effect opens again the "NOR" gate O. At any time thereafter another signal S may, after due inversion by inverter I, pass through gate O causing reinversion by operation of the "NOR" gate function to pass as a true signal into line 20.

Each signal S thus gated through the gate 56 and permitted to enter line 20 performs the four following functions explained, individually and in detail, above and now to be summarized. At first the pulse in line 20 decrements the up and down counter 32. Secondly, it controls the transfer of a character from register 13 to write buffer 16, thirdly, it triggers, i.e., resets the flag flip-flop 14 as an indication that the output of register 13 is ready to receive another character, and fourthly, the pulse S sets the flip-flop 55.

The transfer of a character to the write buffer 16 is directly effective as control of the write head 15. Thus, data are recorded at the rate of the pulses S provided they appear at a proper rate and in alternating sequence with the pulses R due to advance of the disk 36 in one particular direction.

The embodiment as described shows the markers 38 to be used so that the leading as well as the trailing edge of each such marker produces a pulse in line 20 as long as the disk 36 rotates continuously in the same direction. If the differentiated output pulses of the stages 53 and 54 are not rectified, then only every other pulse of each such train can be used in the circuits 55 and 56, in which case there is only one pulse S and one pulse R per marker 38 cycle as disk 36 passes through the scanning station. Similar control results can now be obtained if the markers 43 are phase shifted by 180° relative to the markers 44 in order to maintain the out-of-phase relationship as between the pulses S and R.

As shown schematically in FIG. 3 the invention can also be used in those cases in which the magnetic tape 100 is provided with a special sync or clock track 101. Each clock bit position along the clock track defines the position for a character; in this case a disk such as disk 36 is not needed. The sync track is read by two transducers having gaps 102 and 103 respectively which are phase shifted by half a bit space, and each bit, therefore, produces two pulses in a phase shifted relationship respectively in these two transducers. The output of the transducers are then fed to networks analogous to the stages 53 and 54 and these clock pulses are then processed in the same manner.

It can also be mentioned that the system as described as far as the pulses provided for line 20 is concerned, can also be used for tape reading in that pulses in line 20 control the passage of a character read into an input register. The same problem arises here inasmuch as any oscillatory movement of the tape drive system at the time of a stop should not produce a sequence of such pulses in the line 20 as that would simulate sequential bit or character. The character assembly in case of reading is also described in the above mentioned application. The tach-disk markers will then correspond to a particular fraction of the bit spacing.

Should for any reason the tape 100 be used for cooperation with the transducers such as, for example, the write transducers or read transducers, in each possible direction of tape movement, then it becomes necessary for a reverse direction of rotation of disk 36 to connect the photodetector 51 to the stage 54, and the detector 52 must be connected to the stage 53, in order to maintain the desired relaionship of pulses R and S. Alternatively, pulses S may be applied to "NOR" gate B, and pulses R to the inverter I. These changes in connection are not necessary if one uses only one pulse pair R and S per marker 38 cycle, and if the markers 44 are 180° phase shifted in relation to the markers 43 along the respective tracks 42 and 41. In this case the circuit will operate for either direction of rotation of motor 30 and disk 36.

The invention is not limited to the embodiments described above but all changes and modifications thereof not constituting departures from the spirit and scope of the invention are intended to be covered by the following claims.

What is claimed is:

1. In a digital storage control unit wherein transducing means are coupled to a movable storage medium for transfer of digital information (bits) as between transducing means and the storage medium when moving and wherein digital data bits on the storage medium are organized or are to be organized along at least one track, comprising:

means for moving the storage medium past the transducer, for operative coupling between progressive portions of the storage medium and the transducing means;

means coupled to the storage medium and operating substantially in synchronism with the advance of the storage medium to provide two signal trains each having a frequency proportionate to the speed of the storage medium, the waves of the two wave trains having a phase shift in between;

register means for operative connection to the transducing means for the transfer of digital data in between;

gating means responsive, when enabled, to the signals of a first one of said trains, for controlling said operative connection for the transfer of digital data between the transducing means and the register;

first circuit means responsive to the signals of the first train for disabling the gating means after the signal has passed through the gating means; and second means responsive to the signals of the second train to re-enable the gating means.

2. In a digital storage control unit wherein transducing means are coupled to a movable storage medium for transfer of digital information such as bits between transducing means and storage medium, and wherein digital data bits on the storage medium are organized or are to be organized along at least one track, comprising:

means for moving the storage medium past the transducing means;

braking means for providing a drag on the motion as imparted by the means for moving, on the storage medium for damping oscillations of motor and storage medium at a period immediately preceding complete stopping of motor and storage mediums, the damped oscillations to remain below a predetermined amplitude value;

register means for operative connection to the transducing means, for the transfer of digital data in between;

means coupled to the storage medium and operating substantially in synchronism with the advance thereof to provide two individual signal trains each having a frequency proportionate to the tape speed, the signals of the two trains having a phase shift in between, the phase shift exceeding said particular amplitude value;

means responsive to the pulses of one of said trains for controlling the operative connection between the register means and the transducer for the transfer of digital data between the transducing means and the register means; and means responsive to the said two pulse trains to temporarily inhibit further control operation after a pulse of the first train has appeared up to the time of appearance of a pulse of the second train.

3. In a digital data storage unit, the combination comprising, a storage medium having characteristics for holding manifestations of digital data;

means for moving the storage medium;

a register means for holding digital data;

transducing means for operative coupling to the storage medium for the transfer of digital data manifestations in between;

first means for producing a sequence of pulses including a first pulse for controlling the transfer of digital data between the register means and the transducing means; and means for controlling the first means for producing a second pulse of the sequence to succeed the first pulse only after the storage medium has traveled for a predetermined distance in one direction since production of the first pulse.

4. In a digital storage control unit wherein transducers are coupled to a movable storage medium for a transfer of digital information as between transducer and storage medium and wherein the storage medium progresses past the transducer for coupling the transducer to progressive portions of the storage medium for such data transfer, the combination comprising:

register means for operative connection to the transducer for the transfer of digital data as between the transducer and the register means;

means responsive to the progression of the storage medium to provide a periodically variable manifestation representing the progression of similar increments of the storage medium past the transducer;

means for deriving from said manifestation a pulse train the rate of which represents the speed of the storage medium;

means responsive to the pulses of the train and to said variable manifestations, to provide a representation indicative of whether a pulse of the train is produced pursuant to continued motion of the storage medium in the same direction since production of the respective last pulse of the train;

means for controlling the transfer of digital data between the register and the transducer in response to the pulses of the train; and means for inhibiting a transfer control in the absence of said representation.

5. In a digital tape unit wherein a transducer records digital data on a tape moved past the transducer, the combination comprising:

first means for producing a first pulse train representative of the passage of similar tape increments progressing past the transducer;

second means for generating a second train of pulses representing the passage of similar tape increments past the transducer, the second train being phase shifted in relation to the first train, the pulses of the first train occurring in a particular alternating sequence in relation to the occurrence of the pulses of the second train as long as the tape progresses in the same direction;

means responsive to the pulses of the first train for controlling the rate of recording operations by the transducer means; and means responsive to pulses of the first and second train to inhibit said control operation if the phase relationship between the pulses of the first and the second train indicates at least temporarily an uncontrolled reversal of the direction of tape movement.

6. In a digital recording unit, wherein a plurality of transducers are coupled to a movable storage medium having characteristics of retaining a permanent recordation of signal manifestations applied to the transducers, the combination comprising:

a first register coupled to the transducers for holding digital data while they are being recorded by the transducers;

a second register for holding digital data prior to recording and being connected to the first register for transfer of digital data to the first register;

means for moving the storage carrier past the transducers;

means for controlling the transfer of digital data from the second register to the first register in response to movement of the storage carrier in a particular direction; and means for inhibiting the transfer in response to temporary uncontrolled reversal of direction of movement of the carrier over a distance sufficient to cause the recording of more than one datum at the same carrier location.

7. In a digital storage control unit wherein a transducing means are coupled to a movable storage medium for the transfer of digital signal manifestations between storage medium and transducing means, data storage means operatively connectible to the transducing means;

control means for providing for data transfer between the data storage means and the transducing means;

means for providing a signal train representative of motion of the storage medium past the transducing means in one particular direction only, such production being inhibited during any uncontrolled reversal of direction of motion; and means connected to the signal train providing means for controlling the control means in response to said signal train.

8. In a digital storage as set forth in claim 7, said signal train being a pulse train, the pulse thereof having a frequency proportionate to the speed of the storage medium in said one direction, including the average speed of the storage medium in said one direction during periods of oscillatory motions in said one direction and the opposite direction.

9. In a digital tape unit wherein transducers are coupled to the tape for the transfer of digital information as between transducer and tape and wherein digital data bits on the tape organized along at least one track, comprising:

a prerecorded clock pulse track on said tape;

register means for operative connection to the transducer for transfer of digital data in between;

means responsive to said clock pulse track during motion of said tape providing a train of control pulses;

means for controlling the operative connection between transducer and register means sequentially in response to said control pulses; and means sensitive to the direction of motion of the tape to inhibit said control operation if the tape moves, uncontrolled and temporarily at least, in the wrong direction for an amount sufficient to produce a clock pulse.

References Cited

UNITED STATES PATENTS 3,070,800 12/1962 Brown et al. ------ 340—174.1
3,308,449 3/1967 Uemura ---------- 179—100.2
3,331,053 7/1967 Gindi ------------ 340—174.1

TERRELL W. FEARS, Primary Examiner

W. F. WHITE, Assistant Examiner

U.S. Cl. X.R.

346—74